US008701954B1

(12) United States Patent
Weinmeister (10) Patent No.: US 8,701,954 B1
(45) Date of Patent: Apr. 22, 2014

(54) APPARATUS FOR MOUNTING AND RETAINING HELMET IN HIGH G CONDITIONS

(75) Inventor: Ronald L. Weinmeister, Fort Collins, CO (US)

(73) Assignee: On Scene Solutions, Fort Collins, CO (US)

( * ) Notice: Subject to any disclaimer, the term of this patent is extended or adjusted under 35 U.S.C. 154(b) by 600 days.

(21) Appl. No.: 12/761,280

(22) Filed: Apr. 15, 2010

Related U.S. Application Data (60) Provisional application No. 61/324,202, filed on Apr. 14, 2010.

(51) Int. Cl.
| | |
|---|---|
| B62D 43/00 | (2006.01) |
| B60R 7/00 | (2006.01) |
| B62J 7/00 | (2006.01) |
| B62J 9/00 | (2006.01) |
| B62J 11/00 | (2006.01) |
| B60R 9/00 | (2006.01) |
| A45C 11/02 | (2006.01) |
| B65D 85/18 | (2006.01) |

(52) U.S. Cl.
USPC ............ 224/552; 224/42.24; 224/42.25; 224/42.26; 224/42.27; 224/42.32; 224/42.37; 224/42.38; 224/42.39; 224/42.4; 224/413; 224/423; 224/446; 224/460; 224/495; 206/8

(58) Field of Classification Search
USPC .............. 224/552, 42.24, 42.25, 42.26, 42.27; 206/8
See application file for complete search history.

(56) References Cited

U.S. PATENT DOCUMENTS

| | | | | | |
|---|---|---|---|---|---|
| 1,002,759 | A | * | 9/1911 | Rindge | 248/488 |
| 2,313,115 | A | * | 3/1943 | Allen et al. | 248/156 |
| 2,631,721 | A | * | 3/1953 | Sommerhauser | 206/8 |
| 2,693,275 | A | * | 11/1954 | Smith | 206/8 |
| 2,839,217 | A | * | 6/1958 | Trudeau | 206/8 |
| 3,759,072 | A | * | 9/1973 | McLarnon | 70/59 |
| 3,896,643 | A | * | 7/1975 | Kawakami | 70/59 |
| 4,733,805 | A | | 3/1988 | Sawada | |
| 5,531,364 | A | * | 7/1996 | Buis | 224/413 |
| 5,884,825 | A | * | 3/1999 | Schroeder | 224/413 |
| 2004/0118888 | A1 | | 6/2004 | Russell | |
| 2007/0261212 | A1 | | 11/2007 | Russell | |

OTHER PUBLICATIONS

Ziamatic Corp., "Quic-Storage Helmet Holder Parts and Assembly Instructions," undated.

* cited by examiner

*Primary Examiner* — Brian D Nash
*Assistant Examiner* — Derek Battisti
(74) *Attorney, Agent, or Firm* — James R. Young; Cochran Freund & Young LLC (57) ABSTRACT

Helmet mount apparatus provides a secure helmet holder for mounting a fireman helmet in a fire truck or other emergency vehicle. Three brim brackets, one of which is slidable on a base plate against a spring bias force, clamp the brim of the helmet between the brim brackets. The helmet can be mounted by positioning the brim into the slidable brim bracket and sliding the brim bracket far enough to allow inserting the brim also into the other two brim brackets, and then releasing the helmet to allow the spring bias to clamp the helmet onto the mount apparatus.

9 Claims, 9 Drawing Sheets

APPARATUS FOR MOUNTING AND RETAINING HELMET IN HIGH G CONDITIONS

BACKGROUND OF THE INVENTION

1. Technical Field of the Invention

This invention is related to mounting apparatus and methods for mounting and retaining helmets, such as firemen's helmets, in vehicles.

2. State of the Prior Art

Helmets of many kinds, styles, and designs are made for protecting people's heads, necks, and shoulders in many activities and situations, but mountings for retaining helmets when not in use have not garnered as much attention. There are several specialized mounting systems for mounting helmets on motorcycles, but, generally, anything that would hold a helmet on a wall or on a piece of equipment, out of the way or to protect the helmet, has been considered sufficient. However, the National Fire Protection Association (NFPA) adopted standards in 2009 that focused on firemen's helmets stowed in cabs of fire trucks and emergency vehicles that require the helmets to be mounted in such a manner as to remain secure in the mounting under acceleration g-forces of 9 g forward and back and 3 g from any other direction and roll conditions. Commercially available helmet mounting apparatus at the time these standards were adopted were incapable of meeting those criteria.

The foregoing examples of related art and limitations related therewith are intended to be illustrative, but not exclusive or exhaustive, of the subject matter. Other aspects and limitations of the related art will become apparent to those skilled in the art upon a reading of the specification and a study of the drawings.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting.

In the drawings.

DETAILED DESCRIPTION OF EXAMPLE EMBODIMENTS

Figure 1:
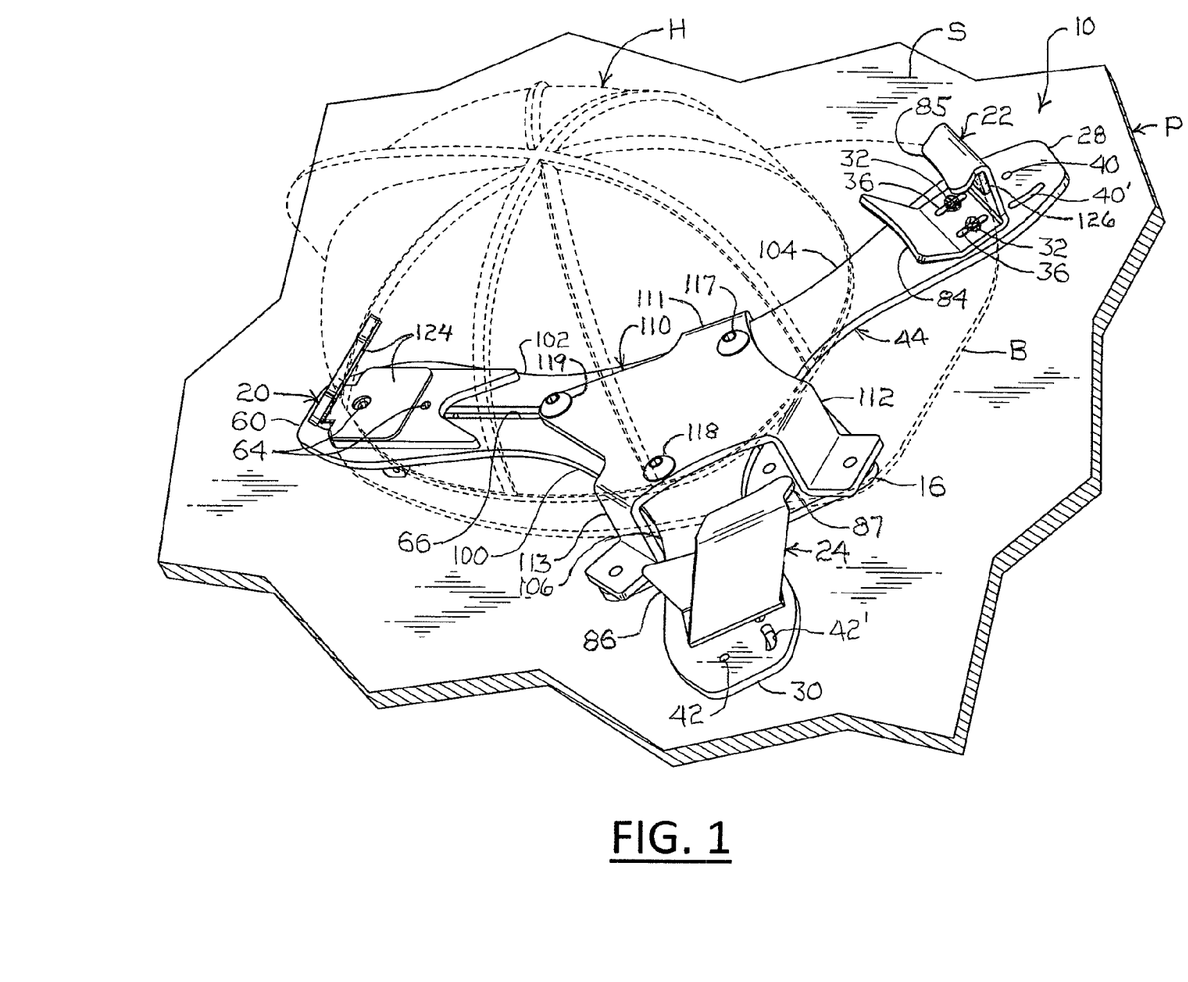
FIG. 1 is a perspective view of an example helmet mount apparatus shown attached to a surface with a fireman's helmet illustrated in phantom lines mounted in the mount apparatus.

An example helmet mount apparatus 10 with a fireman's helmet H illustrated in broken lines is shown in FIG. 1 attached to a surface S, which may be representative of a surface in a cab of a fire truck or other emergency vehicle as one example implementation of the invention, but recognizing that the invention recited in the claims below can also be implemented in myriad other ways, once the principles are understood from the description herein. The surface S could be, for example, a surface of a wall or ceiling panel P, or other surface. The helmet mount apparatus 10 can be fastened to such a surface in any convenient manner that can withstand the minimum 9 g forward and backward acceleration and 3 g accelerations in other directions and rolls according to the NFPA standards. One example fastening system, best seen in FIGS. 5 and 6, can include one or more screws 12 (see FIG. 6) or other suitable fasteners extending through holes 14 in an attachment plate 16 (see FIG. 5) into the surface S of a panel P (see FIG. 6).

Referring again to FIG. 1, the example fireman's helmet H is shown mounted in the helmet mount apparatus 10 with its brim B captured in three brim brackets, e.g., a front brim bracket 20 and two rear-lateral wing brim brackets 22, 24. Although more brim brackets could also be used, the three brim brackets 20, 22, 24, spaced from each other in an orientation somewhat similar to the points of an equilateral triangle, capture and restrain the helmet against movement relative to the helmet mount apparatus 10 in any direction. Fireman helmets are available in a variety of styles and configurations, but most have brims extending to some extent radially outward around the entire circumference of the helmet, so the helmet mount apparatus 10 is suitable for mounting most fireman helmets available to and used by firemen. However, several alternative brim bracket configurations can be provided to accommodate some variations in brim styles and configurations and to accommodate other accoutrements with which some fireman helmets are equipped, as described in more detail below.

Figure 2:
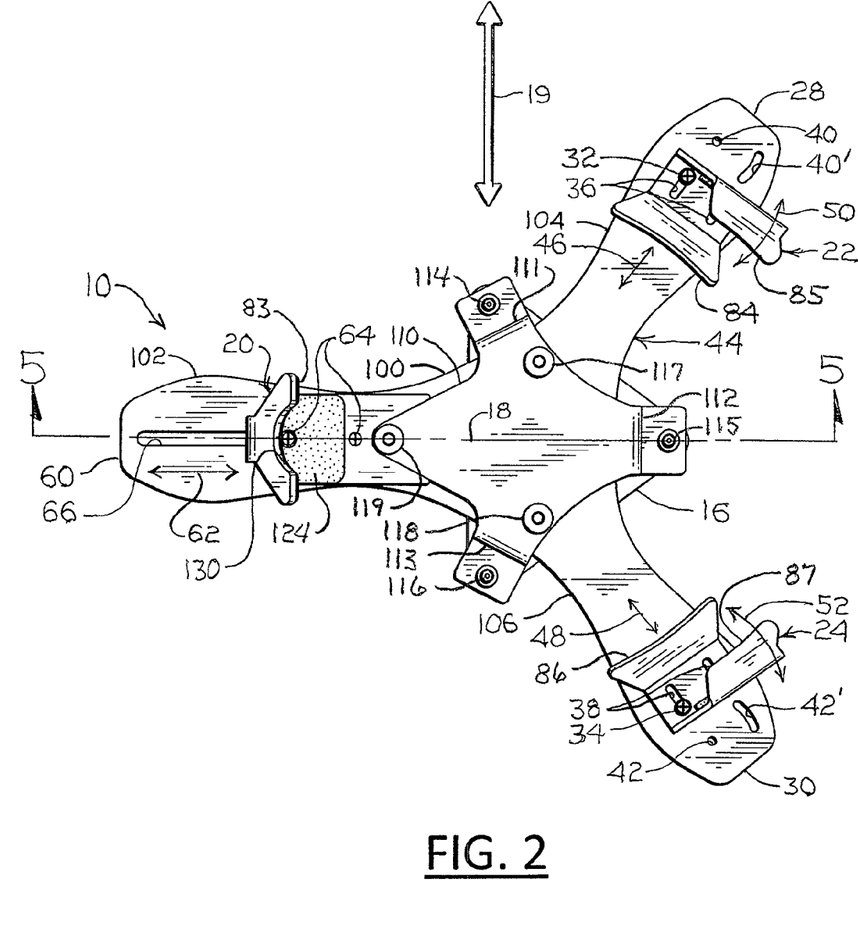
FIG. 2 is a top plan view of the example helmet mount apparatus.
Figure 3:
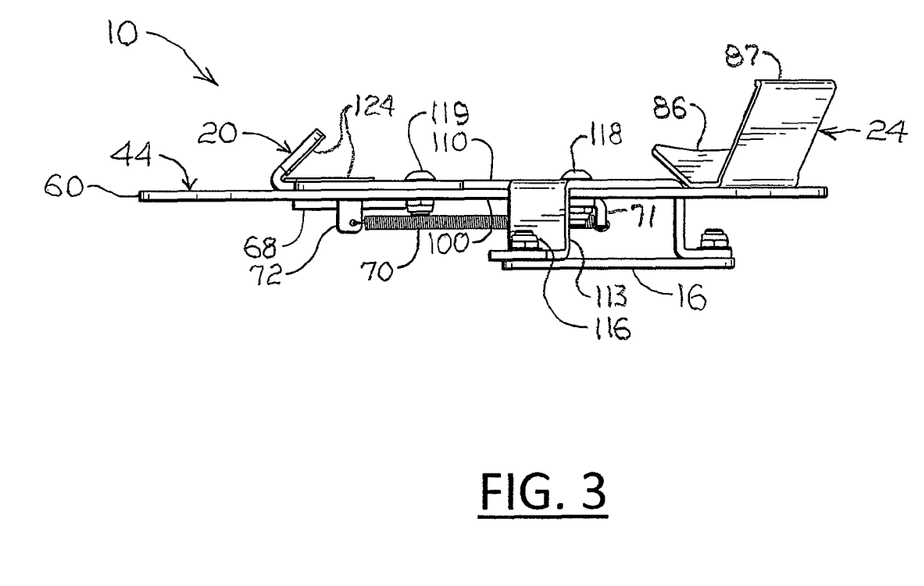
FIG. 3 is a side elevation view of the example helmet mount apparatus.
Figure 5:
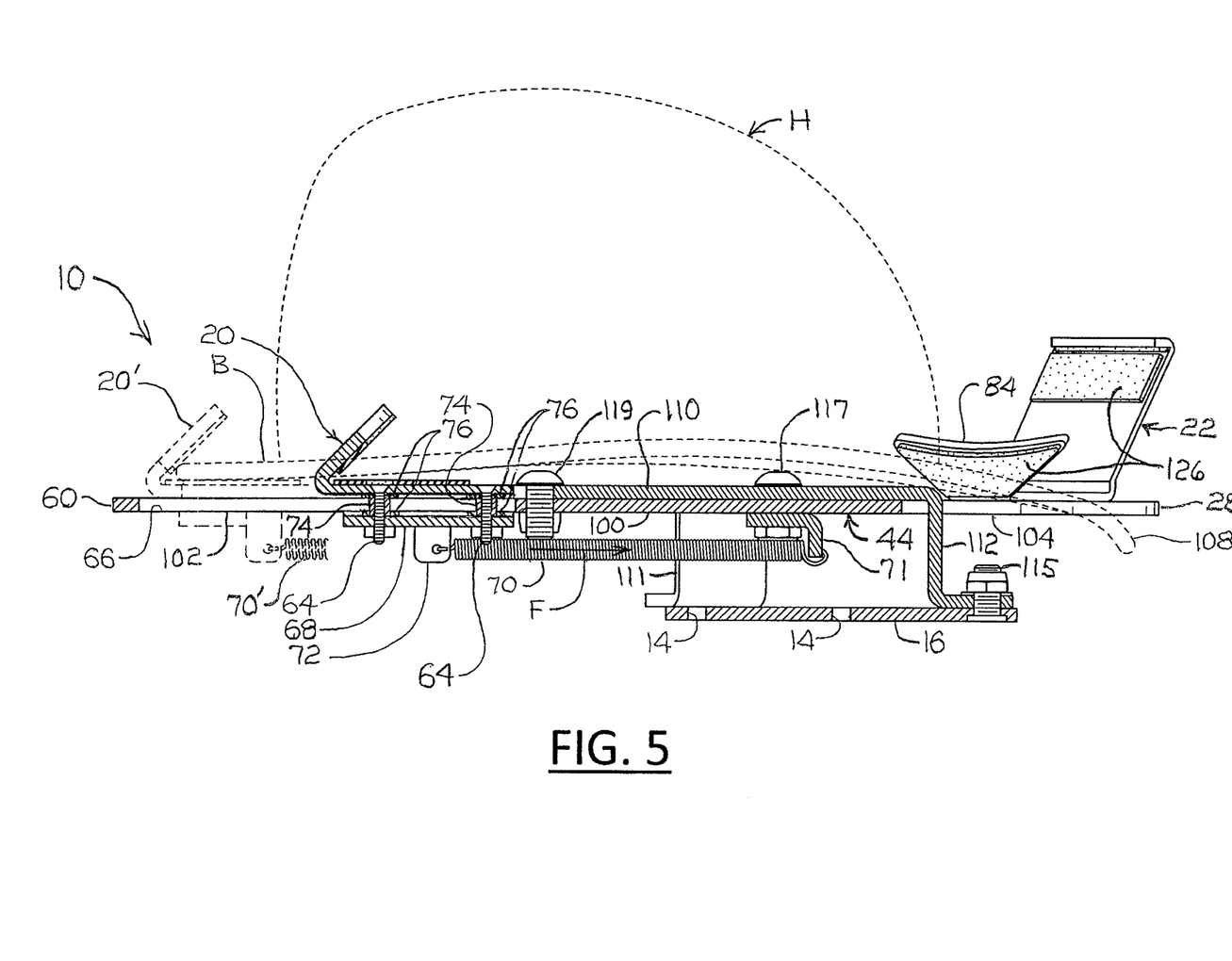
FIG. 5 is a cross-sectional view of the example helmet mount apparatus taken along the section line 5-5 in FIG. 4 and illustrating a fireman's helmet in phantom lines mounted in the helmet mount apparatus.
Figure 7:
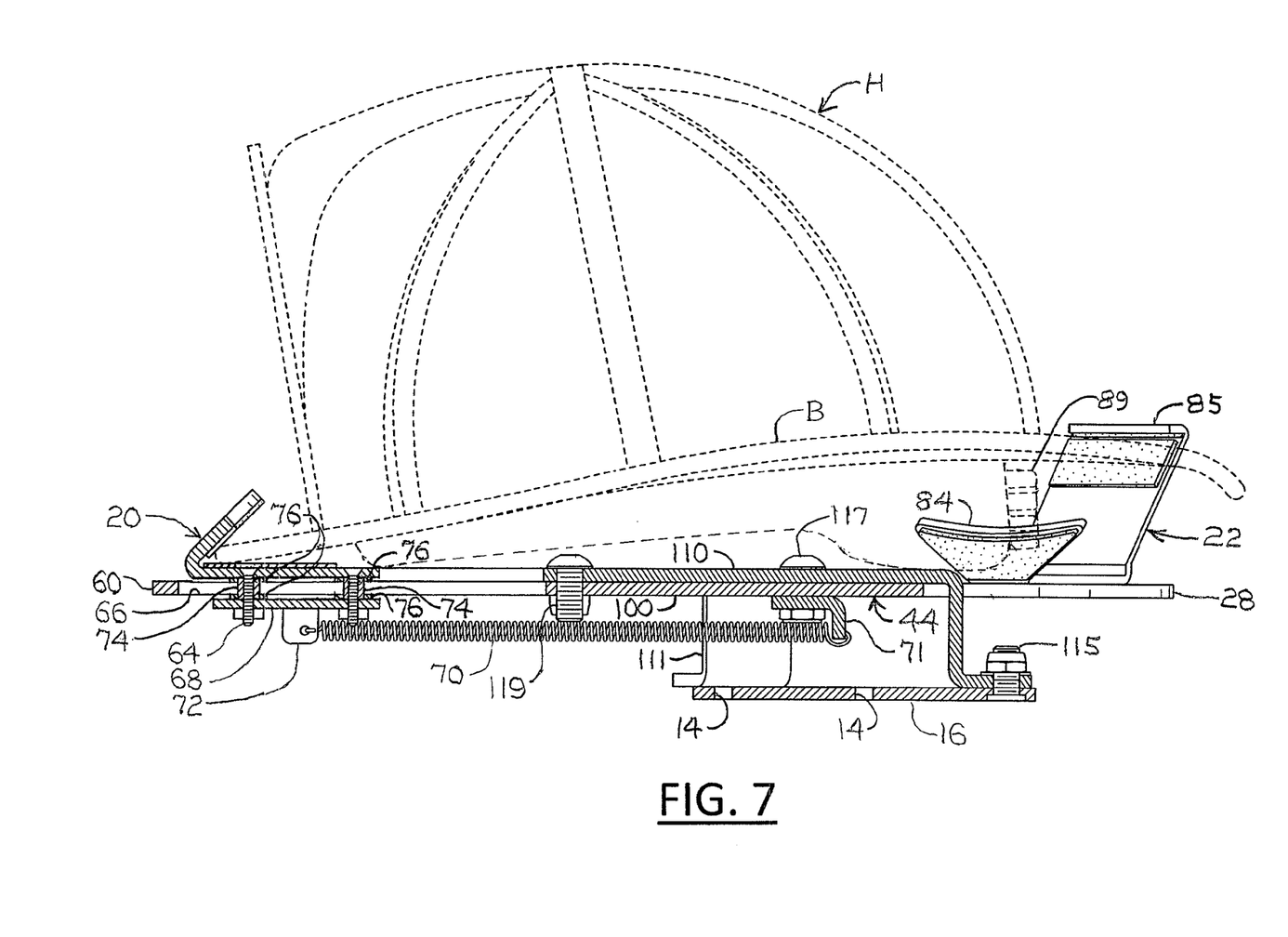
FIG. 7 is a cross-sectional view of the example helmet mount apparatus similar to FIG. 5 and a fireman's helmet that is shaped or equipped in a configuration that is more suitable for being mounted and retained by alternative brim brackets on the helmet mount apparatus.

In this description, directional terms, e.g., front, rear, top, bottom, lower, upper, lateral, and others are used for convenience and are generally oriented in directions that one would also use to describe the helmets H as they are shown in FIGS. 1, 5, and 7 in relation to the helmet mount apparatus 10. However, these directional terms are not intended to be limiting, since the helmet mount apparatus 10 can be mounted on any convenient panel or surface, including horizontally, vertically, upside down, or variations in-between. In general, though, the helmet mount apparatus 10 should be attached to a panel P or object in the fire truck or emergency vehicle oriented as shown in FIG. 2 with the longitudinal axis 18 of the mount apparatus 10 (and helmet H mounted in the mount apparatus 10) perpendicular to the longitudinal axis 19 i.e., direction of travel, of the fire truck or emergency vehicle. This orientation is preferred so that the greatest g-force of the helmet H, which would likely occur in the event of a head-on collision of the fire truck or emergency vehicle with another vehicle or object, would not be directed longitudinally against the slidable brim bracket 20, which will be described in more detail below. Alternatively, attaching the helmet mount apparatus 10 with its longitudinal axis 18 in the same direction as the longitudinal axis 19 of the fire truck or emergency vehicle with the slidable brim bracket 20 facing opposite the normal direction of travel of the fire truck or emergency vehicle would also apply the g-force of the helmet H in a head-on collision against the two fixed-in-place, rear-lateral wing brim brackets 22, 24 instead of on the slidable brim bracket 20.

Figure 4:
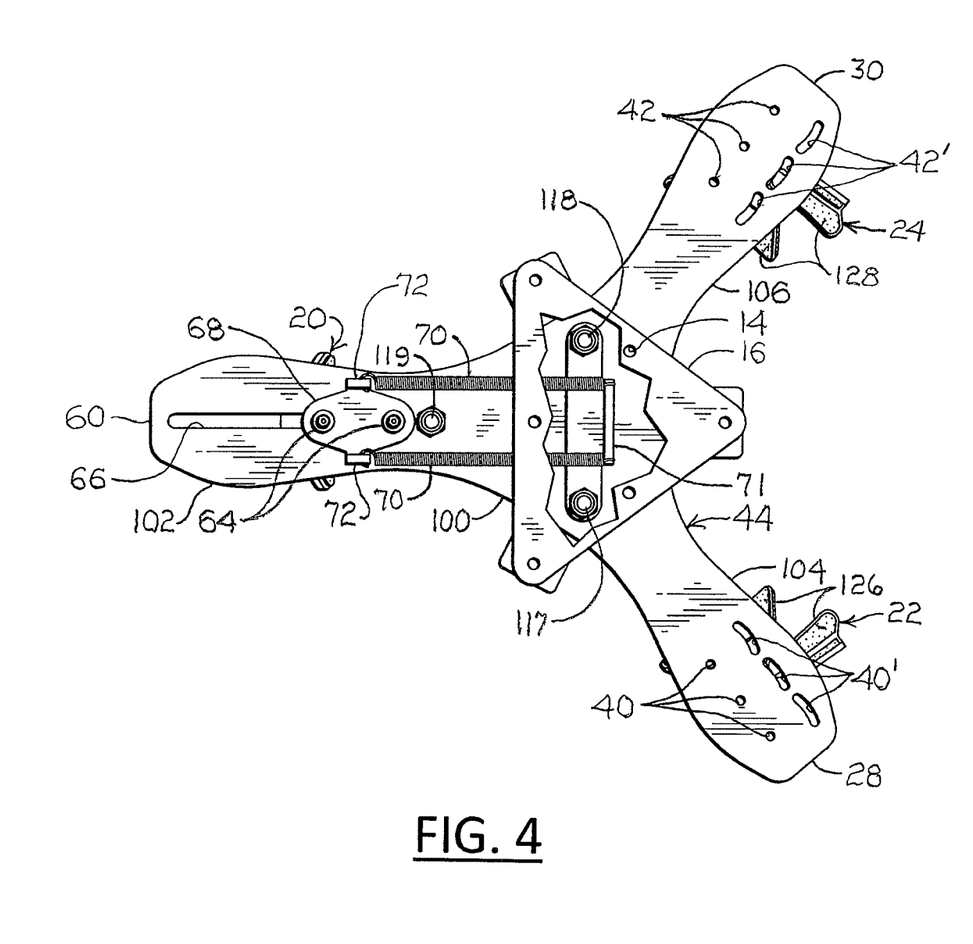
FIG. 4 is bottom plan view of the example helmet mount apparatus with a portion of the attachment plate cut away to reveal spring attachments.

The two rear-lateral wing brim brackets 22, 24, are adjustably fastened onto a base plate 44 adjacent the respective distal ends 28, 30 of the base plate 44 by appropriate bolts or other suitable fasteners 32, 34 (see FIGS. 1 and 2) extending through slotted holes 36, 38 in the brackets 22, 24 into selected sets of holes 40, 42 in the base plate 44, but, once set and fastened in the desired positions and orientations to best mount a particular helmet H, the two rear-lateral wing brim brackets 22, 24 are immovable in relation to the base plate 44. The slotted holes 36, 38 in the brim brackets 22, 24 accommodate setting the brim brackets 22, 24 radially inwardly and outwardly as indicated by arrows 46, 48 in FIG. 2, and one of the holes in each set of holes in the base plate 44, e.g., holes 40', 42', can be slotted in a curved sector of a circle, as shown in FIGS. 1, 2, and 4, to accommodate some pivotal orientation of the brackets 22, 24 on the base plate 44 as indicated by arrows 50, 52 in FIG. 2. However, once the rear-lateral wing brackets are oriented as desired for a particular helmet H, the bolts 32, 34 are tightened to prohibit any movement of the rear-lateral brim brackets 22, 24 in relation to the base plate 44.

The front brim bracket 20, however, is slidably mounted on the base plate 44 adjacent the front distal end 60 to accommodate radially inward and outward movement of the front brim bracket 20 in relation to the base plate 44, as indicated by arrow 62 in FIG. 2. One or more bolts 64 or other suitable fasteners are provided to extend through holes in the front brim bracket 20, through a slotted hole 66 in the base plate 44 adjacent the distal end 60, and through a retainer plate 68 under the base plate 44 to capture the front brim bracket 20 on the base plate 44 while allowing slidable movement of the front brim bracket 20 back and forth in the direction of the arrow 62, while one or more springs 70 connected to ears 72 on the retainer plate 68 provide a tensile force to pull the front brim bracket 20 radially inward in relation to the base plate 44. Spacers 74 and bushings 76 around the bolts 64, as best seen in FIG. 5, allow the bolts 64 to be tightened without inhibiting the sliding movement of the front brim bracket 20 on the base plate 44 as described above. Therefore, when the helmet H is mounted, the front brim bracket 20 is movable radially outwardly, against the force of the springs 70, as shown by broken lines 20' and 70' in FIG. 5, to accommodate insertion of, and capturing, the brim B of the helmet H in the front brim bracket 20. The springs 70, with force in the direction of the force arrow F, then pull the helmet H back into tight engagement with the rear-lateral wing brackets 22, 24 to securely clamp and retain the helmet H in place on the helmet mount apparatus 10. To remove the helmet H from the mount apparatus 10, the front brim bracket 20 can be forced against the spring force F, until the brim B is released from the rear-lateral wing brackets 22, 24, and then the brim B can also be released from the front brim bracket 20. Of course, the slidable mounting of the front brim bracket 20 on the base plate 44 with the spring force F described above is only an example, and myriad other mechanisms for slidable mountings movable against a directional force can be used for this purpose, as would be recognized by persons skilled in the art, once they understand the principles of this invention.

Figure 6:
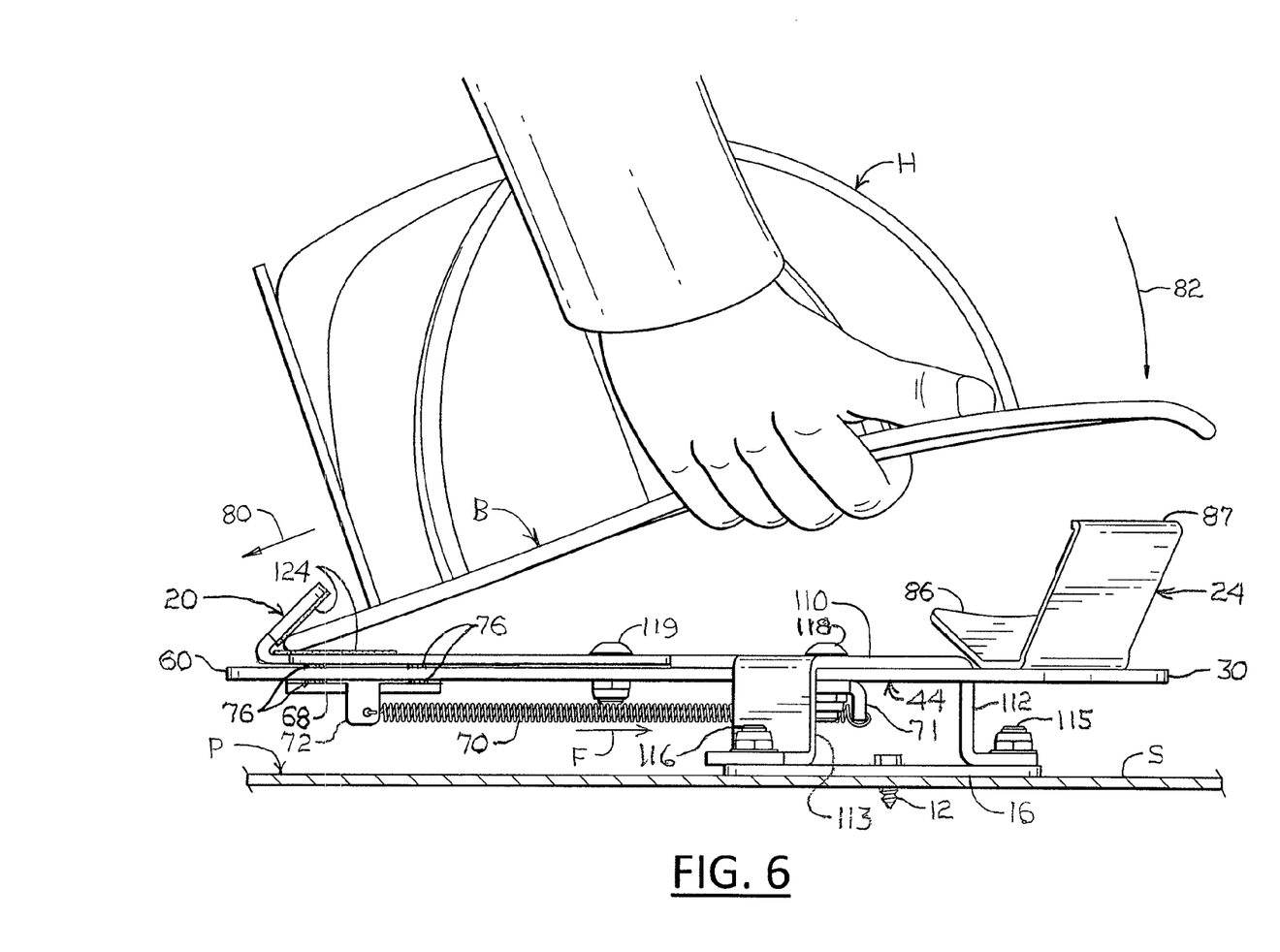
FIG. 6 is a side elevation view of the example helmet mount apparatus and a fireman's helmet poised in a position to illustrate how the helmet can be manipulated to mount in the helmet mount apparatus.

An example mounting process is illustrated in FIG. 6, wherein the front portion of the brim B of the helmet H is inserted into the front brim bracket 20 and then pushed forward, as indicated by arrow 80, with enough force to overcome the spring force F. Then, with the front brim bracket 20 pushed forward, the back of the helmet H is pivoted in the front brim bracket 20 toward the base plate 44 as indicated by arrow 82 to position the rear portion of the brim B into alignment with the lateral-rear wing brackets 22, 24, whereupon the forward force against the force F of the springs 70 can be released to allow the springs 70 to pull the helmet brim B tightly against the wing brackets 22, 24 to clamp and secure the helmet H in the mount apparatus 10 as explained above and shown in FIGS. 1 and 5.

The example helmet H shown in FIG. 5 has a structure and brim B shape or configuration that allows the rear portion of the brim B to slide under and be retained by the lower lips 84, 86 of wing brackets 22, 24, respectively. However, some helmets H may be shaped and equipped in a manner that prohibits them from being aligned with, and inserted into, the wing brackets 22, 24. For example, the helmet H illustrated in FIG. 1 may have an upturned brim B in the rear-lateral area that prevents insertion under the lower lips 84, 86. For another example, the helmet illustrated in FIG. 7 may have a head band 88 and/or head band adjustment mechanism 89 or other accoutrement that protrudes far enough below the brim B that it contacts the frame 90 or base plate 44 of the helmet mount apparatus 10 and prevents the brim B from being positioned far enough down on the mount apparatus 10 to be inserted under the lower lips 84, 86. Therefore, in addition to the lower lips 84, 86 described above, the rear-lateral wing brim brackets 22, 24 shown in FIGS. 1-8 also have upper lips 85, 87, respectively, which extend farther from the base plate 44 than the lower lips 84, 86 in order to accommodate, receive, and retain the brim B of a helmet H that may not be shaped or equipped in a manner that can be inserted into the lower lips 84, 86. The upper lips 85, 87 can also be positioned rearward of lower lips 84, 86 and, if desired, to extend inwardly, toward the longitudinal axis 18, i.e., farther angularly than the lower lip of that brim bracket toward the other brim bracket as best seen in FIGS. 2 and 4, in order to engage or capture more of a brim B that extends a greater distance rearward from the helmet body or head piece.

As mentioned above, the brim brackets 20, 22, 24 are positioned in spatial relation to each other similar to the points of an equilateral triangle, although other relative distances and angles between them, e.g., as points of a non-equilateral triangle, can also be used. To position the brim brackets 20, 22, 24 in that spatial relationship, the base plate 44 is configured with arms 102, 104, 106 extending radially from a hub or center section 100, with the brim brackets 20, 22, 24 mounted adjacent the distal ends 60, 28, 30 of the respective arms 102, 104, 106. The space between adjacent arms, for example, between adjacent arms 104, 106, can accommodate portions of the brim B of the helmet H that may curve or extend downwardly, as shown, for example, by broken lines 108 in FIG. 5.

As explained above, the helmet mount apparatus 10 can include an attachment plate 16 for attaching the helmet mount apparatus 10 to a panel or other suitable surface in a cab of a fire truck or other emergency vehicle. In the example helmet mount apparatus 10, a frame piece 110 is provided to attach the base plate 44 to the attachment plate 16. To provide space for the spring 70 and a spring anchor 71 under the base plate 44, as shown in FIGS. 3-7, the frame piece 110 has three legs 111, 112, 113 extending downwardly for attachment by bolts 114, 115, 116 or other suitable fasteners to the attachment plate 16 so that the frame piece 110 stands off or away from the attachment plate 16. The base plate 44 in this example is fastened to the frame piece 110 by bolts 117, 118, 119 or other suitable fasteners. The spring anchor 71 can also be fastened to the base plate 44 by the bolts 117, 118 or other suitable fasteners. Other fastening implementations could also be used, such as rivets, welding, adhesive, clamps, and many others.

Figure 8:
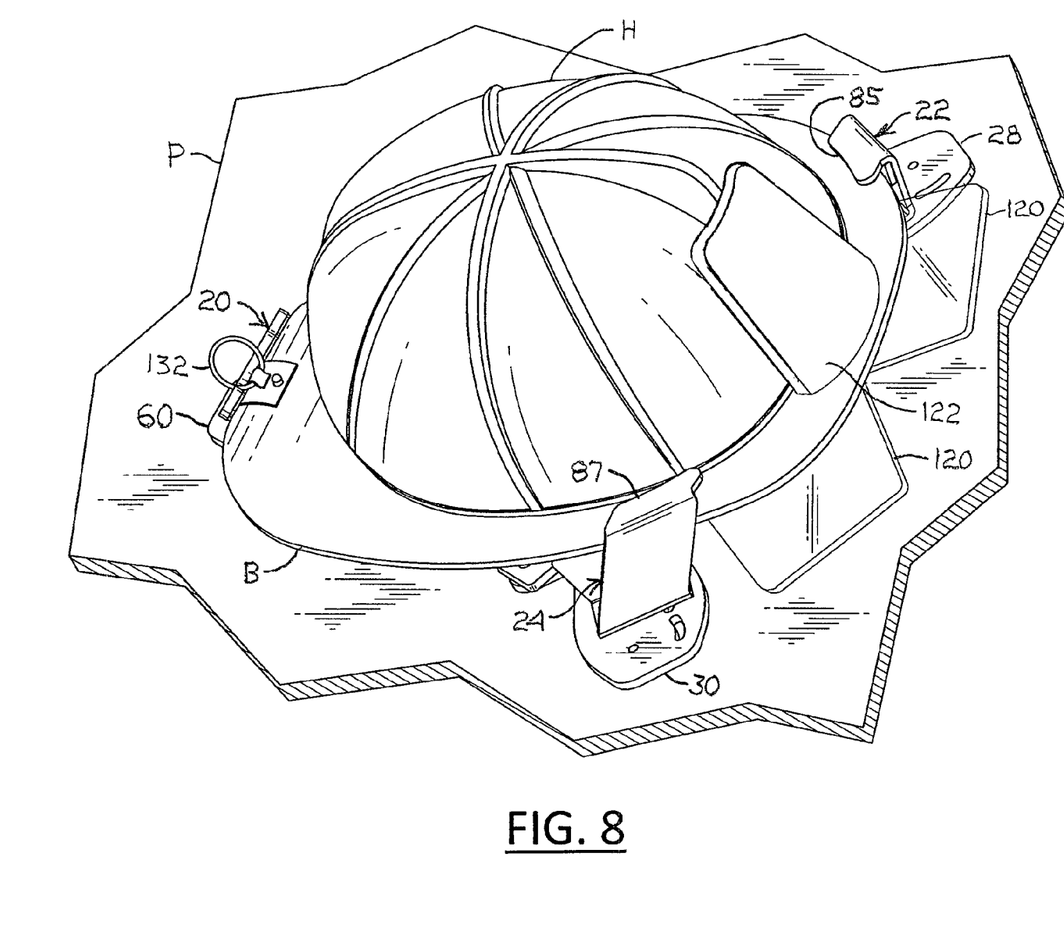
FIG. 8 is a perspective view of the example helmet mount apparatus similar to FIG. 1, but with an example helmet equipped with auxiliary visor pieces protruding from under the front brim, mounted in a reverse orientation in the helmet mount apparatus to accommodate the protruding visor pieces.

The helmet H does not have to be mounted with the front of the helmet H in the front brim bracket 20. As shown in FIG. 8, the helmet H could be turned around and mounted with its front positioned between the two rear-lateral wing brim brackets 22, 24, for example, to accommodate other accoutrements that some firemen use on their helmets, such as the visors 120 or large emblem 122. When mounted in this reversed orientation, the visors 120 and/or emblem 122 are positioned between the two rear-lateral wing brim brackets 22, 24, whereas they would interfere with the front brim bracket 20 if they were mounted with the front of the helmet brim B in the front brim bracket 20. In this manner of mounting, the rear portion of the brim B can be inserted first into the front brim bracket 20 of the helmet mount apparatus 10 and used to push the front brim bracket 20 radially outward overcoming the spring force F in a similar manner as explained above until the front-lateral portions of the brim B can be inserted either under the lower lips 84, 86, or, in the example case of downwardly and outwardly extending visors 120 shown in FIG. 8, under the upper lips 85, 87 of the rear-lateral brackets 22, 24. Then, the helmet H can be released, and the springs 70 anchored to the spring anchor 71 applying force F to the front brim bracket 20 will pull and clamp the helmet brim B tightly between the three brim brackets 20, 22, 24 to securely mount the helmet H onto the helmet mount apparatus 10 attached to a panel P or other surface or structure in the fire truck or other emergency vehicle as explained above. In this reverse mounting orientation, a recess 130 can be provided in the lip 83 of the front brim bracket 20, as best seen in FIG. 2 to accommodate other accoutrements on the helmet H, such as the typical hanger hook 132 shown in FIG. 8, which are common on many helmets. Padded surface material, such as those shown at 124, 126, 128, can be provided in the brim brackets 20, 24, 26 to avoid scuffing or marring the brim B surfaces.

Figure 9:
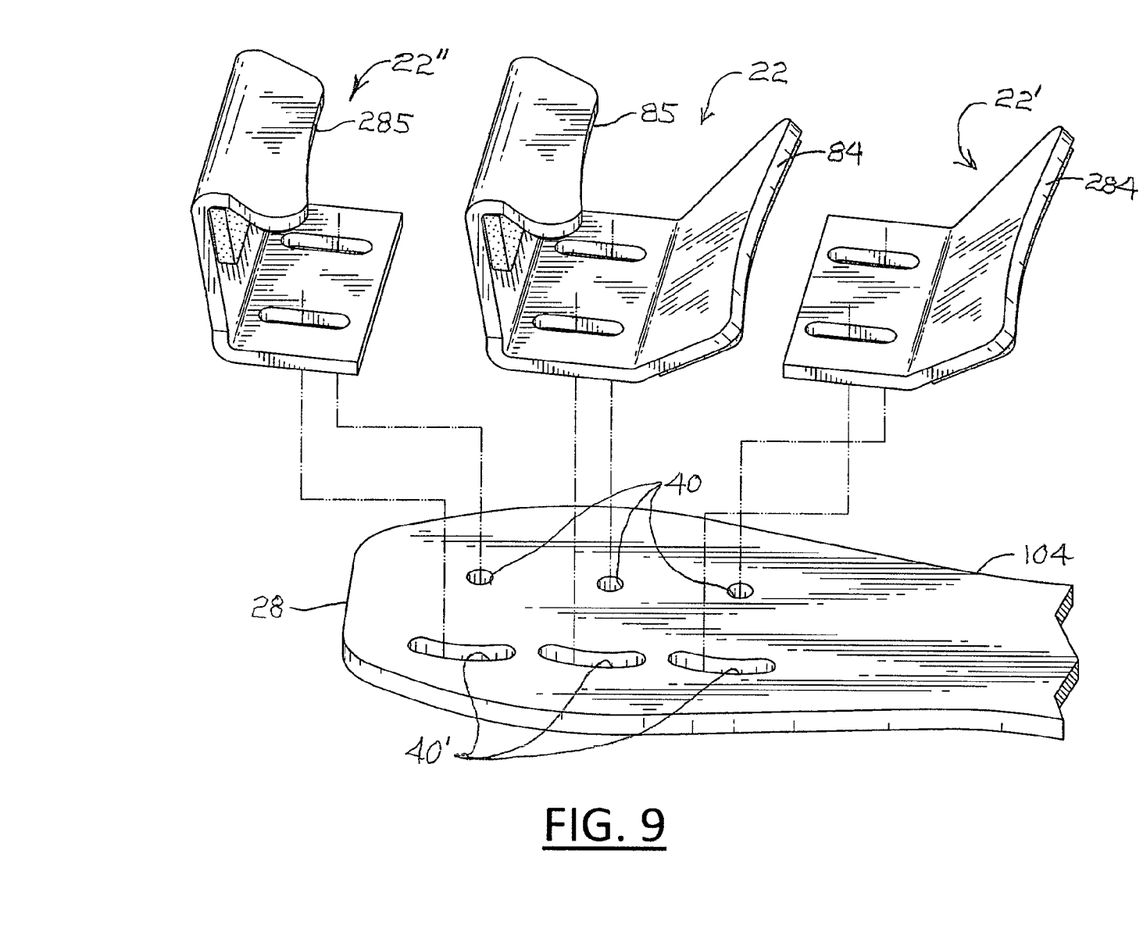
FIG. 9 is an enlarged perspective view of three alternative brim brackets poised over a branch of the base plate.

While the rear-lateral wing brim brackets 22, 24 described above have both the respective lower lips 84, 86 and upper lips 85, 87, alternate brim brackets 22' or 22" shown in FIG. 9 could be used instead. For example, as shown in FIG. 9, the wing brim bracket 22 could be replaced with the alternate wing brim bracket 22', which has only the lower lip 284, if it is to be used only for helmets H that can be accommodated and mounted securely by the lower lips. For another example, as also shown in FIG. 9, the wing brim bracket 22 could be replaced with the alternate wing brim bracket 22", which has only the upper lip 285, if it is to be used only for helmets H that can be accommodated and mounted securely by the upper lips.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

It is therefore intended that the following appended claims and claims hereafter introduced are interpreted to include all of these and other modifications, permutations, additions and sub-combinations as are within the spirit and scope of the claims. The words "comprise," "comprises," "comprising," "composed," "composes," "composing," "include," "including," and "includes" when used in this specification, including the claims, are intended to specify the presence of stated features, integers, components, or steps, but they do not preclude the presence or addition of one or more other features, integers, components, steps, or groups thereof.

The invention claimed is:

1. Helmet mount apparatus for mounting a helmet of a type used by firemen with an annular brim of some shape extending around a protective head cover, such helmet mount apparatus being particularly adapted for mounting such a helmet of the type used by firemen securely in a fire truck or other emergency vehicle in which the fireman rides to emergency situations and being characterized by three brim brackets attached to a base plate, two of the three brim brackets being rear-lateral brim brackets mounted in immovable relation to the base plate and the remaining one of the three brim brackets being a front brim bracket mounted in a slidable manner along a longitudinal axis that extends between the two rear-lateral brim brackets and through the front brim bracket, and wherein the rear-lateral brim brackets each has a lip extending radially inwardly and upwardly in relation to the base plate and is configured and oriented to receive and retain the annular brim of the helmet under the lip and are spaced apart from each other at locations as vertices of a triangle and at respective distances in relation to each other that enable the three brim brackets to receive and retain the annular brim of the helmet at three respective locations on the perimeter of the annular brim of the helmet that prevent movement of the helmet in any direction in relation to the base plate except upon slidable movement of the slidably mounted brim bracket along the longitudinal axis away from the two immovably mounted brim brackets, the helmet mount apparatus being further characterized by a force mechanism connected to the slidably mounted brim bracket in a manner that applies a force on the slidably mounted brim bracket in a manner that clamps and retains the brim of the helmet in the brim brackets, whereby a fireman can mount the helmet by inserting one portion of the perimeter of the brim of the helmet in the slidably mounted brim bracket and push the slidably mounted brim bracket along the longitudinal axis away from the two immovably mounted rear-lateral brim brackets far enough to clear the lips of the rear-lateral brim brackets and then pivot the helmet in the slidably mounted pivot bracket toward the base plate to position other portions of the brim of the helmet into alignment with the two immovably mounted brim brackets whereupon the said other portions of the brim of the helmet are movable under the lips of the rear-lateral brackets to clamp and secure the helmet in the helmet mount apparatus.

2. The helmet mount apparatus of claim 1, wherein the force mechanism includes a spring connected between the front brim bracket and the base plate such that slidable movement of the front brim bracket along the longitudinal axis away from the other rear-lateral brim brackets requires a force strong enough to overcome the force of the spring.

3. The helmet mount apparatus of claim 2, including a frame piece that provides stand-off space under the base plate, and the spring is positioned in the stand-off space under the base plate so that the spring does not hinder the pivot movement of the helmet in the slidably mounted pivot bracket toward the base plate to position other portions of the brim of the helmet into alignment with the two rear-lateral brim brackets.

4. The helmet mount apparatus of claim 1, wherein each of the two brim brackets that is fixed in immovable relation to the base plate includes a lower lip and an upper lip, the upper lip being farther from the base plate than the lower lip, and wherein each lower lip and each upper lip is shaped to engage a brim of the helmet that is inserted into the brim bracket in a manner that prevents separation of the brim of the helmet from the base plate in a direction perpendicular to the base plate.

5. The helmet mount apparatus of claim 4, wherein the upper lip of each rear-lateral brim bracket is positioned farther radially outward than the lower lip of that brim bracket.

6. The helmet mount apparatus of claim 4, wherein the upper lip of each brim bracket that is fixed in immovable relation to the base plate extends farther angularly than the lower lip of that brim bracket toward the other brim bracket.

7. The helmet mount apparatus of claim 1, wherein the force mechanism applies a force large enough on the front brim bracket to prevent movement of the front brim bracket along the longitudinal axis away from the two rear lateral brim brackets and thereby prevent separation of the helmet from the helmet mount apparatus under a g-force magnitude of 9 g in any direction from perpendicular to the longitudinal axis in one direction, through a 180 degree arc that extends away from the front brim bracket, to the opposite perpendicular direction from the longitudinal axis.

8. The helmet mount apparatus of claim 1, wherein the rear-lateral brim brackets are radially adjustable on the base plate.

9. The helmet mount apparatus of claim 1, wherein the rear lateral brim brackets are rotationally adjustable on the base plate.

* * * * *